United States Patent [19]
Hibino et al.

[11] Patent Number: 5,751,343
[45] Date of Patent: May 12, 1998

[54] FILM IMAGE REPRODUCTION SIGNAL OUTPUT APPARATUS

[75] Inventors: Hideo Hibino, Kawasaki; Kazuyuki Kazami; Norikazu Yokonuma, both of Tokyo; Hisashi Okutsu, Yokohama, all of Japan

[73] Assignee: Nikon Corporation, Tokyo, Japan

[21] Appl. No.: 795,131

[22] Filed: Feb. 7, 1997

[30] Foreign Application Priority Data

Feb. 9, 1996 [JP] Japan ................... 8-024275

[51] Int. Cl.⁶ ................................. H04N 7/18
[52] U.S. Cl. ............................. 348/96; 358/506
[58] Field of Search .................... 348/96, 73, 74; 358/506; 354/275; H04N 7/18

[56] References Cited

U.S. PATENT DOCUMENTS

| 4,797,737 | 1/1989 | Yazawa | 348/73 |
| 4,978,985 | 12/1990 | Smart et al. | 354/275 |
| 5,032,861 | 7/1991 | Pagano | 354/275 |
| 5,623,303 | 4/1997 | Inoue | 348/96 |
| 5,633,733 | 5/1997 | Miyazawa | 348/96 |

FOREIGN PATENT DOCUMENTS

A-5-75922  3/1993  Japan.

Primary Examiner—Howard W. Britton
Attorney, Agent, or Firm—Oliff & Berridge, PLC

[57] ABSTRACT

A film image reproduction signal output apparatus is provided which picks up an image on a developed film by a CCD, and produces an image reproduction signal by an image pickup circuit so that the image is displayed on a monitor. The present output apparatus detects whether the film contained in a cartridge loaded in the apparatus is a negative film or a positive film. If the negative film is detected, the image pickup circuit produces the image reproduction signal by reversing an image signal received from the CCD, for display on the monitor.

11 Claims, 18 Drawing Sheets

| POSITION | SELECTABLE MODE | | |
|---|---|---|---|
| NEGATIVE | AUTO 1 | AUTO 2 | MANUAL |
| POSITIVE |  | AUTO 2 | MANUAL |
| CAMERA | AUTO 1 |  | MANUAL |

IN "NEGATIVE" POSITION

IN "POSITIVE" POSITION

IN "CAMERA" POSITION

FILM IMAGE REPRODUCTION SIGNAL OUTPUT APPARATUS

This application claims the priority of Japanese Patent Application No. 8-24275 filed Feb. 9, 1996, the disclosure of which is expressly incorporated by reference herein.

FIELD OF THE INVENTION

The present invention relates to a film image reproduction signal output apparatus adapted to generate signals for reproducing images of a developed film on a monitor or the like.

DESCRIPTION OF THE RELATED ART

A film image display apparatus is known which displays, on a monitor, images on a photographic film that has been developed and stored in a cartridge, as disclosed in Japanese laid-open (Kokai) Patent Publication No. 5-75922. The apparatus of this type is provided with an operating member for selecting a negative film or a positive film, which member is selectively operated according to the type of the film mounted in the apparatus.

In the conventional film image display device, the selection between negative film and positive film must be done manually, which deteriorates the operability of the device. Besides, if an operator makes a mistake in selecting the type of the film, an image that is reversed with respect to the intended or desired image is displayed on the display apparatus.

SUMMARY OF THE INVENTION

It is therefore an object of the present invention to provide a film image reproduction signal output apparatus adapted to automatically select a negative film or a positive film according to the type of the film mounted in the apparatus.

According to a first aspect of the present invention, there is provided a film image reproduction signal output apparatus comprising: an image pickup device that picks up an image on a film that has been developed; an image reproduction circuit that produces an image reproduction signal based on an image signal received from the image pickup device; a film type detector that determines whether the film is a negative film or a positive film; and a control circuit that controls the image reproduction circuit so as to produce the image reproduction signal by reversing the image signal from the image pickup device when the film type detector determines that the film is a negative film.

According to a second aspect of the present invention, there is provided a film image reproduction signal output apparatus, comprising: an apparatus body that holds a film that has been developed; a camera unit that picks up an image on the film, the camera unit being detachable from the apparatus body; an image reproduction circuit that produces an image reproduction signal based on an image signal received from the camera unit; a camera unit state detector that determines whether the camera unit is attached to or detached from the apparatus body; a film type detector that determines whether the film is a negative film or a positive film; and a control circuit that controls the image reproduction circuit so as to produce the image reproduction signal by reversing the image signal from the camera unit if the camera unit state detector determines that the camera unit is attached to the apparatus body, and the film type detector determines that the film is a negative film.

The film type detector may determine whether the film is a negative film or a positive film based on information recorded on the film or a film cartridge containing the film.

The control circuit may recognize that the film is a negative film when the film type detector is incapable of determining whether the film is a negative film or a positive film.

DETAILED DESCRIPTION OF THE PREFERRED EMBODIMENTS

Figure 1:
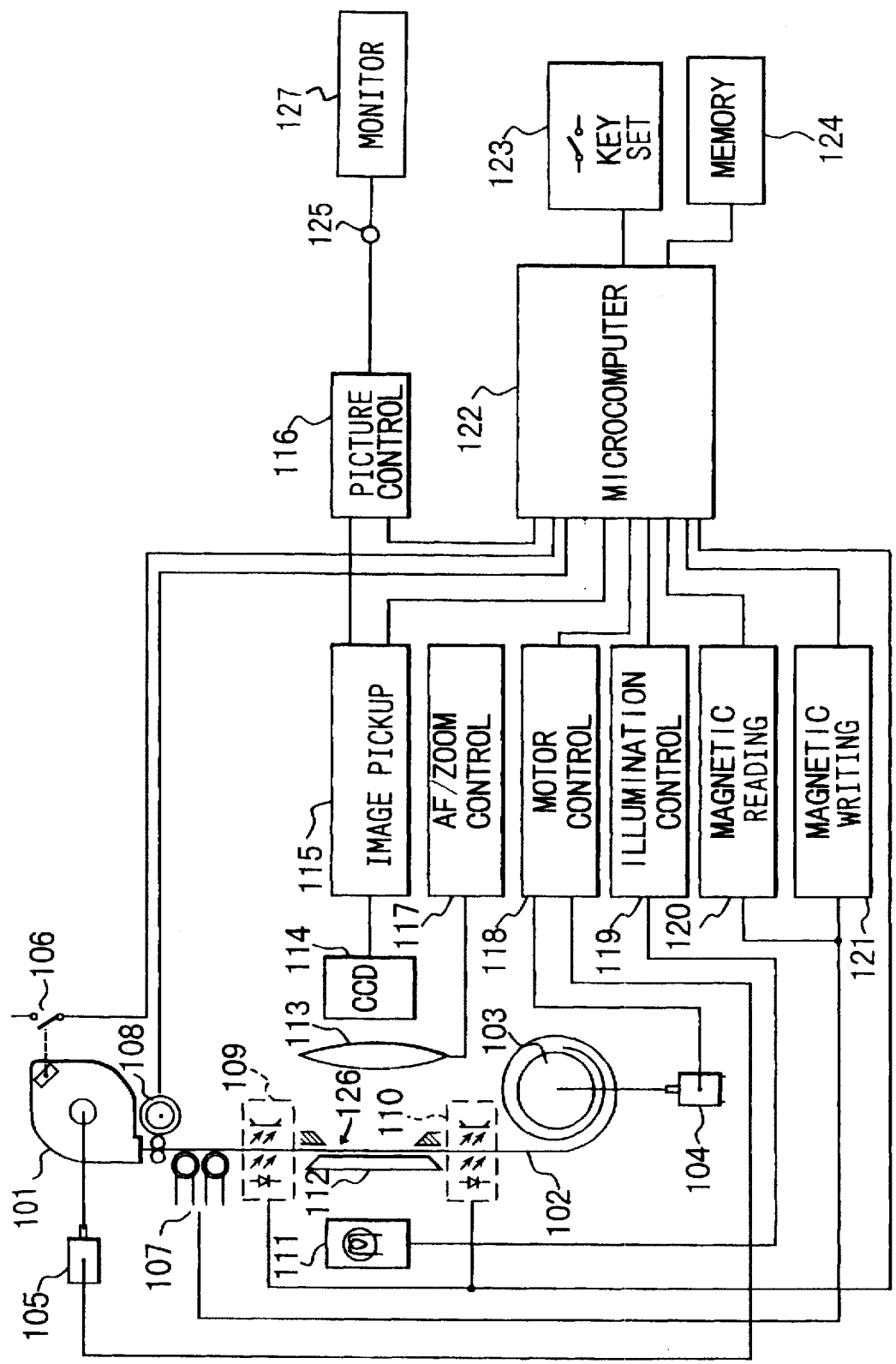
FIG. 1 is a view showing the construction of one embodiment of the film image reproduction signal output apparatus of the present invention.

FIG. 1 shows the whole construction of the film image reproduction signal output apparatus according to the present invention.

A cartridge 101 and a film 102 are of a drop-in loading type as disclosed in U.S. Pat. No. 5,032,861 or Japan Laid-Open Patent Publication No. 3-75741 (which corresponds to U.S. Pat. No. 4,978,985), wherein the film 102 is completely or entirely accommodated in the cartridge 101 while it is not used, and is fed out of the cartridge 101 when it is used. The cartridge 101 is provided with a mechanism for displaying the condition of use of the film 102, such as "unexposed", "exposed" or "developed". The film 102 is fed by a spool 103 of the film image reproduction signal output apparatus and a motor 104, and a spool of the cartridge 101 and a motor 105. The film 102 is taken up on the spool 103 by driving the motor 104 to rotate the spool 103. The film 102 is fed out of the cartridge 101 and rewound on the spool of the cartridge 101 by driving the motor 105 to rotate the spool of the cartridge 101.

A switch 106 operates in accordance with the mechanism provided on the cartridge 101 for displaying the condition of use of the film 102, to determine whether the film 102 has been developed or not. A magnetic head 107 reads information magnetically recorded on the film 102, and also magnetically records information on the film 102. A film encoder 108 rotates in association with movement of the film 102, so as to measure the moving speed and moving distance of the film 102. Interrupters 109, 110 are adapted to detect perforations of the film 102. An illuminating light source 111 illuminates the film 102 through a diffusion plate 112. The diffusion plate 112 diffuses light emitted by the light source 111 after converting it into a white light, and also serves as a pressure plate for the film 102. A photographing lens 113 forms an image of the film 102 located in an image area 126 onto a CCD 114, which in turn reads the image of the film 102 located in the image area 126 and converts it into electric signals.

An image pickup circuit 115 converts an image signal from the CCD 114 into a video signal. A picture control circuit 116 processes the video signal received from the image pickup circuit 115, and produces a desired image. This picture control circuit 116 has a superimposing function. An AF/zoom control circuit 117 effects focusing and zooming by moving the photographing lens 113, and also controls rotation and movements in X and Y directions of the CCD 114. A motor control circuit 118 controls driving of the take-up motor 104 and rewinding motor 105. An illumination control circuit 119 controls turning-on and -off of the illuminating light source 111. A magnetic reading circuit 120 drives the magnetic head 107 to reproduce magnetically recorded information on the film 102, while a magnetic writing circuit 121 drives the magnetic head 107 to magnetically record information on the film 102.

A microcomputer (hereinafter called "CPU") 122 is adapted to control the above-described equipment so as to control operations, such as film feeding and image reproduction, of the film image reproduction signal output apparatus. A set of keys 123 are operating members with which an operator directs operations and enters information, and include an operating switch for feeding the film 102, an operating switch for moving the film image projected on a monitor screen in the vertical and lateral directions, a rotation switch for rotating the film image, a mode select switch, and an image correction switch. A memory 124 is a non-volatile memory in which are recorded cartridge information and data disc information provided on the cartridge 101, and magnetically recorded information provided on the film 102. These kinds of information will be described in detail later. A video output 125 is a terminal that outputs picture signals, that is image reproduction signals, to a monitor, a VCR (video cassette recorder) or a printer. The monitor 127 is a display device such as a CRT, an LCD and a plasma display. A normal television set can be also used as the monitor 127.

The present film image reproduction signal output apparatus is also provided with the function of moving the image displayed on the monitor 127 in the vertical and lateral directions, function of determining whether the image is being moved in the vertical or lateral direction and detecting the amount of the movement, function of determining whether the image is being rotated and detecting the amount of the rotation, and zooming function of displaying in enlargement a part of the image displayed on the monitor screen.

Figure 2:
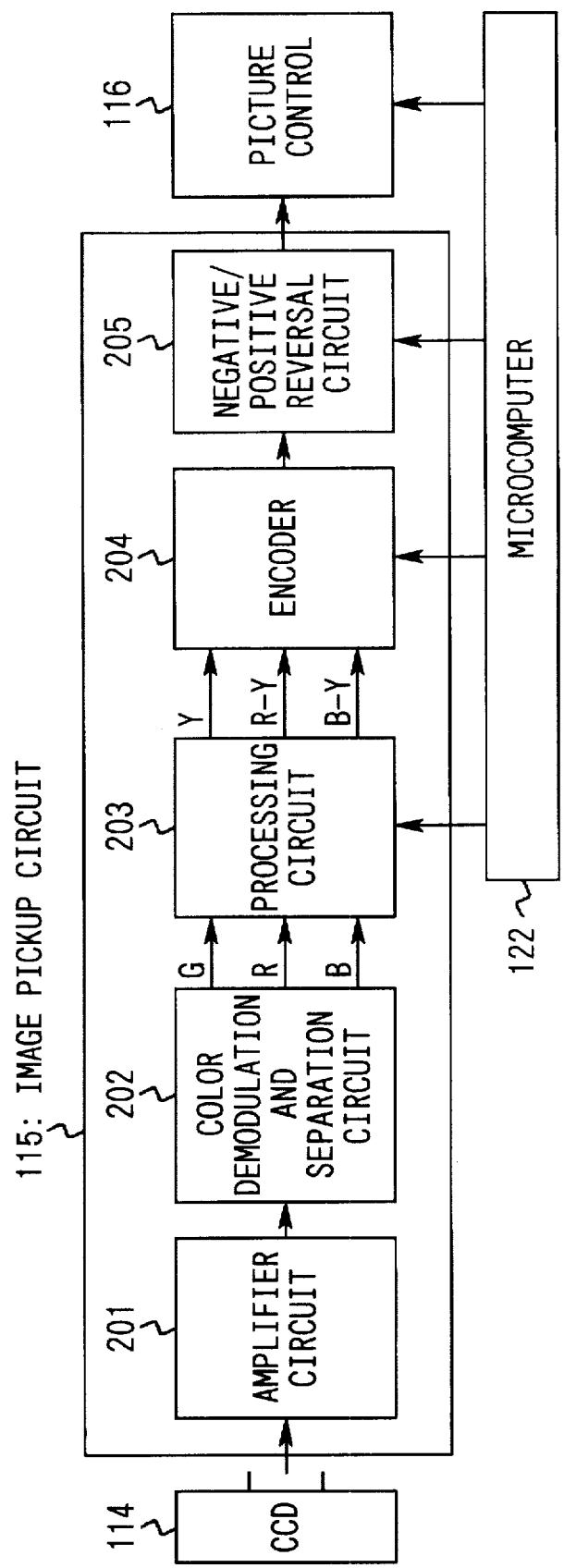
FIG. 2 is a view showing the construction of an image pickup circuit.

FIG. 2 shows the construction of the image pickup circuit 115.

An amplifier circuit 201 has an AGC (automatic gain control) function, and amplifies an image signal generated by the CCD 114 while controlling the amplification factor according to the amplitude of the image signal. A color demodulation and separation circuit 202 separates the image signal amplified by the amplifier circuit 201 into three primary colors, i.e., R, G and B, and generates respective color signals. A processing circuit 203 has image correcting functions, such as white balance, luminance correction, contour correction, and color correction, and produces luminance signals Y and color difference signals (R-Y), (B-Y) from the color signals of the three primary colors generated by the color demodulation and separation circuit 202 in accordance with commands from the CPU 122. This processing circuit 203 will be described in detail later. An encoder 204 produces composite signals or signals (S-terminal signals) in which Y signals and C signals are separated from each other, from the luminance signals Y and color difference signals (R-Y), (B-Y) produced by the processing circuit 203, according to commands from the CPU 122. A negative/positive reversal circuit 205 normally converts an image signal of a negative film picked up by the CCD 114, into a corresponding positive image signal, according to commands from the CPU 122. In this conversion, the luminance signals are reversed, and the color signals of red, yellow and green are converted into respective complementary colors of cyan, blue and green.

Figure 3:
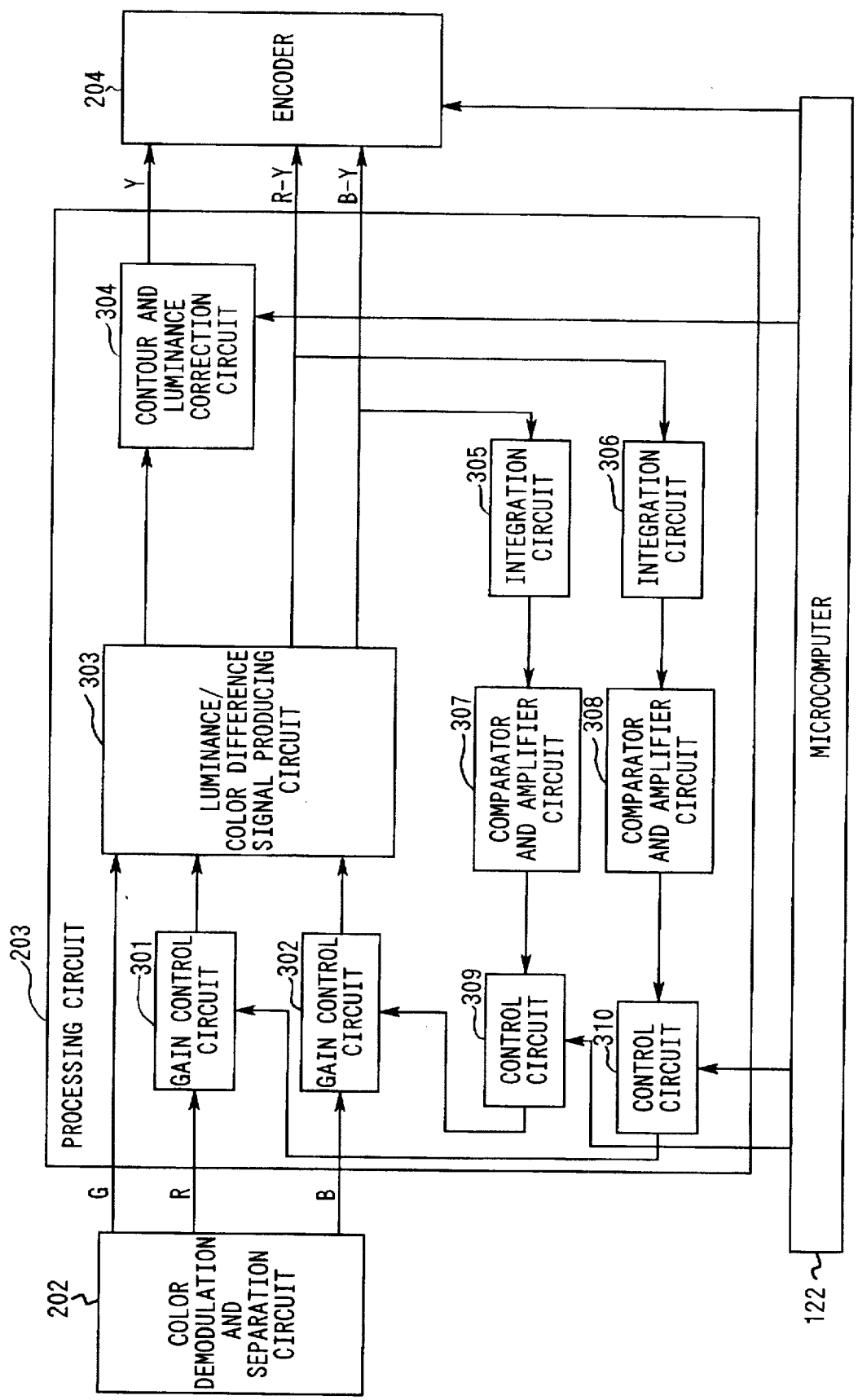
FIG. 3 is a view showing the construction of a processing circuit.

FIG. 3 shows the construction of the processing circuit 203.

The R, G, B output signals of the image pickup circuit 115 must be controlled so that the output ratio of R:G:B becomes 1:1:1 when an image of a while subject is picked up. However, since the color temperature varies depending upon the illuminating light source, the output ratio of R:G:B varies if the white subject image is picked up at different color temperatures, resulting in deterioration in the image picked up. In view of this problem, white balance control is performed so that when the white subject image is picked up, the output ratio of R:G:B becomes 1:1:1 even with variations in the color temperature.

This processing circuit 203 uses color difference signals produced from signals from the CCD as color temperature information, and performs automatic white balance control utilizing the principle that the average value of numerous screens or a screen that lasts for a long time becomes almost white. Namely, the color difference signals (R-Y), (B-Y) are respectively integrated so as to obtain values corresponding to the average value of the screen that lasts for a long time, and gains of the color signals R and B are controlled in closed loop so that the thus obtained values become zero.

A gain control circuit 301 controls the gain of the color signal R according to a command from a control circuit 310 which will be described later, to perform correction with respect to red color. Similarly, a gain control circuit 302 controls the gain of the color signal B according to a command from a control circuit 309, to perform correction with respect to blue color. A luminance and color difference signal producing circuit 303 produces luminance signals Y and color difference signals (R-Y), (B-Y) from the color signals of three primary colors R, G, B, according to commands from the CPU 122. A contour and luminance correction circuit 304 performs corrections with respect to the contour and luminance of the image according to commands from the CPU 122. The contour correction means making a contour portion (edge portion) clear or distinct to produce a hard image, or, to the contrary, producing a soft image with light flavor. The luminance correction means controlling the brightness of the image displayed on the monitor 127.

An integration circuit 305 integrates the color difference signal (B-Y), and an integration circuit 306 integrates the color difference signal (R-Y). A comparator and amplifier circuit 307 produces a signal that controls the gain of the color signal B so that the integrated output of the color signal (B-Y) generated by the integration circuit 305 becomes 0. Similarly, a comparator and amplifier circuit 308 produces a signal that controls the gain of the color signal R so that the integrated output of the color signal (R-Y) generated by the integration circuit 306 becomes 0.

The control circuit 309 controls the gain of the color signal B according to either the gain control signal produced by the comparator and amplifier circuit 307 or commands of the CPU 122. The former case, i.e., control with the gain control signal, is automatic white balance control based on the image signal read from the CCD 114, and the latter case, i.e., control with commands of the CPU 122, is white balance control using a fixed value, wherein the color correction is performed by correction signals received from the CPU 122.

Similarly, the control circuit 310 controls the gain of the color signal R according to either the gain control signal produced by the comparator and amplifier circuit 308 or commands of the CPU 122. The former case is automatic white balance control based on the image signal read from the CCD 114, and the latter case is white balance control using a fixed value, wherein the color correction is performed by correction signals received from the CPU 122.

Figure 4:
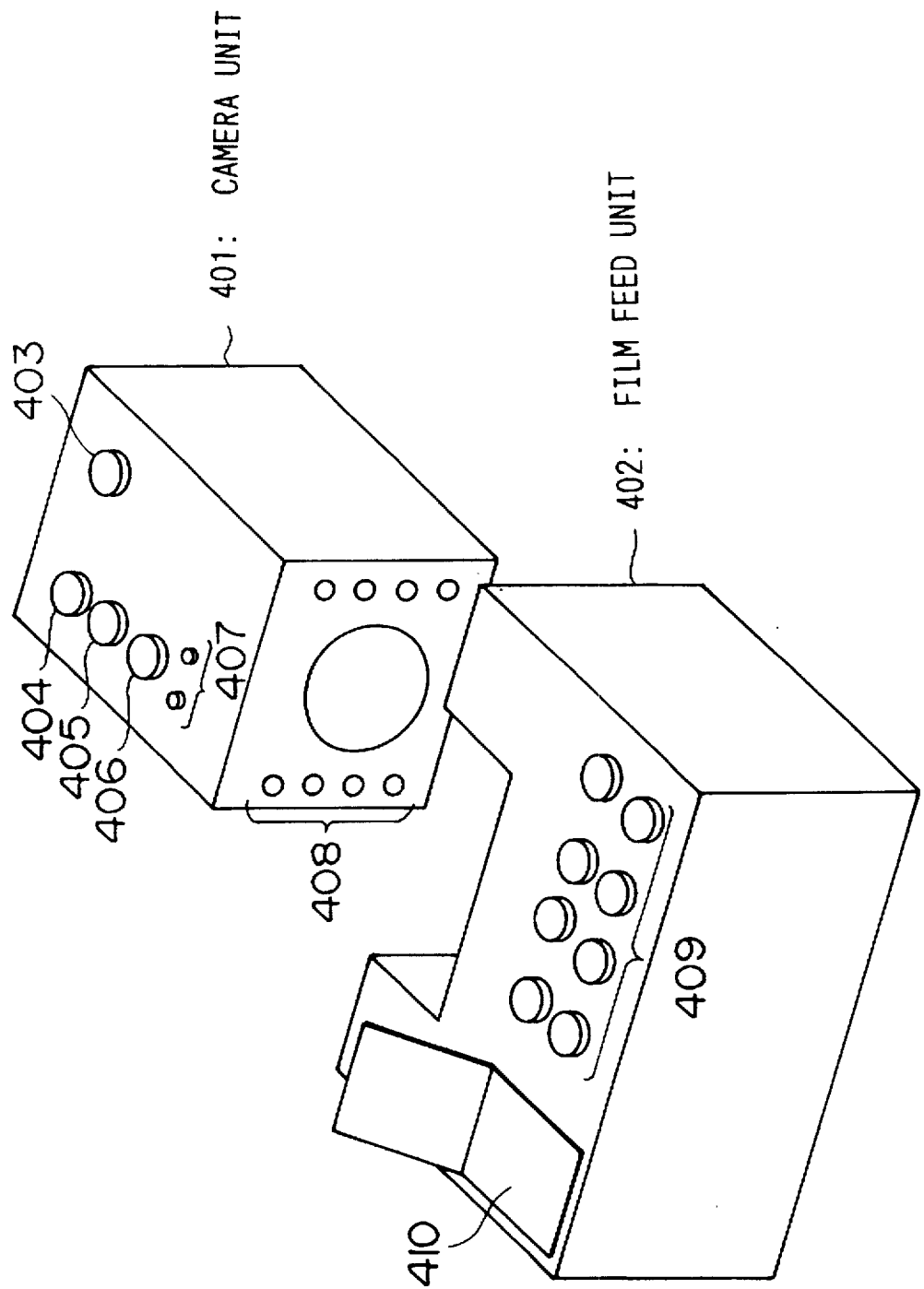
FIG. 4 is a perspective view showing the exterior of the film image reproduction signal output apparatus.

FIG. 4 is a perspective view showing the exterior of constituent units of the film image reproduction signal output apparatus.

The present film image reproduction signal output apparatus is dividable into a camera unit 401 and a film feed unit 402. The camera unit 401 may be attached to and detached from the film feed unit 402 as the main body of the apparatus, and is adapted to pick up an image of the film 102 loaded into a cartridge chamber 410 while it is attached to the unit 402. The camera unit 401 may be separated from the film feed unit 402, to be used alone for taking pictures of various subjects other than films. For example, the camera unit 401 is able to take a picture of a scene or the like, or a printed matter on a print or paper. When the camera unit 401 is attached to the film feed unit 402, electric circuits of both units 401, 402 are connected to each other by a connector 408.

These two units 401, 402 are provided with switches 403-409 included in the set of keys 123 of FIG. 1. The camera unit 401 has a power source switch 403, position select switch 404, mode select switch 405, correction item select switch 406 and a correction value input switch 407.

Figure 17:
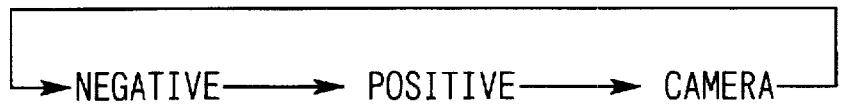
FIG. 17 is a view showing the manner of switching the positions by a position select switch.

The position select switch 404 is designed for selecting a position from "negative", "positive" and "camera", and the positions can be switched in a cyclic fashion each time the switch 404 is pressed, as shown in FIG. 17.

The mode selection switch 405 is designed for selecting a mode from "auto 1", "auto 2" and "manual". The above-described automatic white balance control is performed in the "auto 1" mode, and the white balance control using a predetermined fixed value is performed in the "auto 2" mode. In both of the "auto 1" and "auto 2" modes, automatic exposure (AE) control is performed. In the "manual" mode, on the other hand, the luminance correction, color correction (R, B correction), contrast correction and contour correction can be performed.

Figures 15, 16:
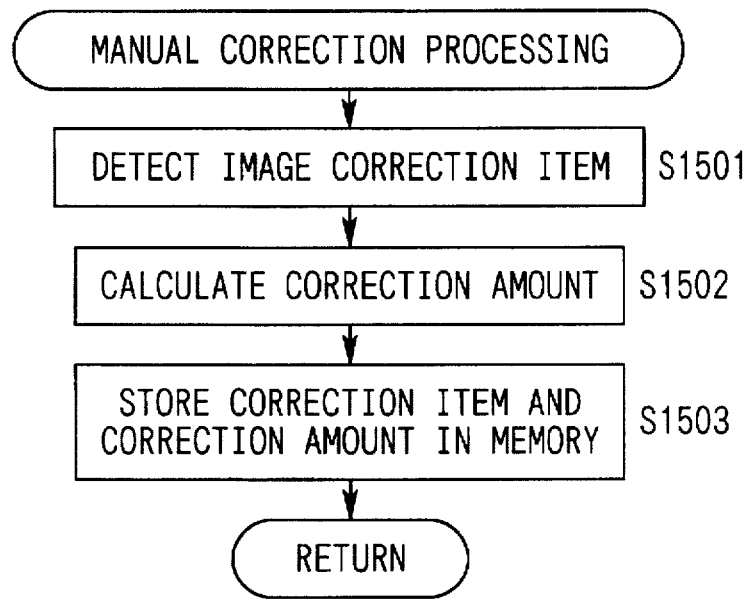
FIG. 15 is a flow chart following that of FIG. 14.
FIG. 16 is a view showing selectable modes that can be set with respect to each position.
Figure 18A:
FIG. 18A–C is a view showing the manner of switching the modes in each position by a mode select switch.
Figure 18B:
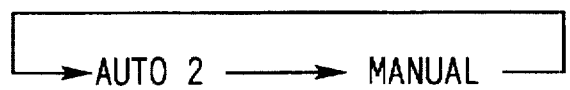
Figure 18C:
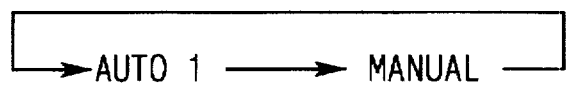

As shown in FIG. 16, some modes cannot be selected depending upon the position selected. In the "negative" position, all of the "auto 1", "auto 2" and "manual" modes are selectable, and these three modes can be switched in a cyclic fashion each time the switch 405 is pressed, as shown in FIG. 18A. In the "positive" position, only the "auto 2" and "manual" modes are selectable, and these "auto 2" and "manual" mode can be switched alternately each time the switch 405 is pressed, as shown in FIG. 18B. In the "camera" position, only the "auto 1" and "manual" modes are selectable, and the "auto 1" mode and "manual" mode can be switched alternately each time the switch 405 is pressed, as shown in FIG. 18C.

Figure 19:
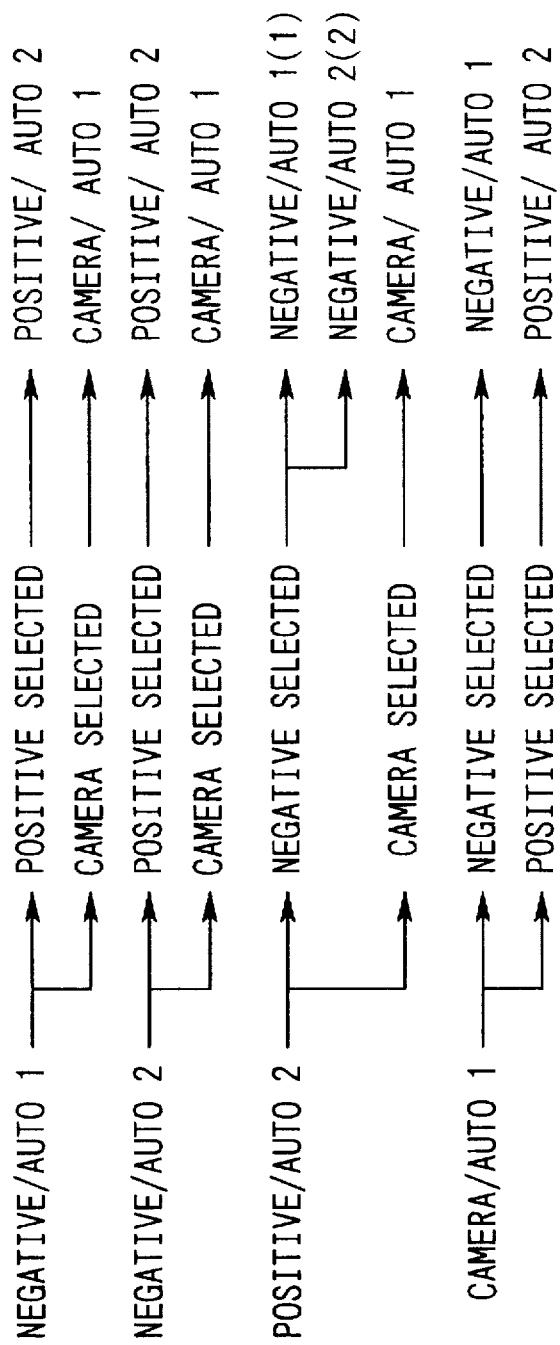
FIG. 19 is a view showing changes of the mode when the position is changed.

FIG. 19 shows changes of the mode when the position is changed when certain position and mode are selected.

If the "positive" position is selected while the "negative" position and "auto 1" mode are set (as represented by "negative/auto 1" in FIG. 19), the "auto 1" mode, which cannot be selected in the "positive" position, is automatically switched to the "auto 2" mode, so that "positive/auto 2" state is established. If the "camera" position is selected in "negative/auto 1" state (while the "negative" position and "auto 1" mode are set), "camera/auto 1" state is established since the "auto 1" mode can be selected in the "camera" position. Similarly, an appropriate one of the modes is automatically selected according to FIG. 19 when the position is changed from "negative/auto 2" state, "positive/auto 2" state, and "camera/auto 1" state.

When the "negative" position is selected in the "positive/auto 2" state, the mode is selected depending upon the presence of information "image should not be corrected" that is magnetically recorded on the film 102. If the "image should not be corrected" information is not recorded, the "auto 1" mode is selected as shown in (1) to establish "negative/auto 1" state. If the "image should not be corrected" information is recorded, the "auto 2" mode is selected as shown in (2) to establish "negative/auto 2" state.

Figure 20:
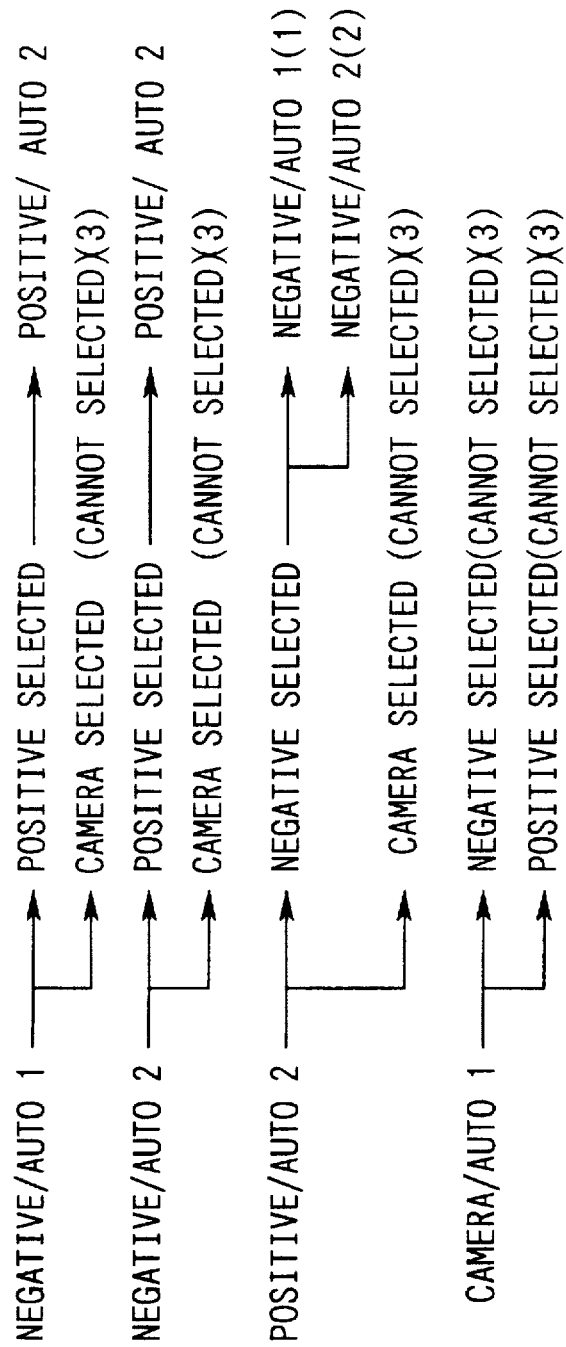
FIG. 20 is a view showing another example of changes of the mode when the position is changed.

The modes may be changed in the manner as shown in FIG. 20 when the position is changed. In FIG. 20, (1) indicates the case where the above described "image should not be corrected" information is not recorded, and (2) indicates the case where the "image should not be corrected" information is recorded, while (3) indicates that the relevant position cannot be selected.

Figure 21:
FIG. 21 is a view showing the manner of switching image correction items when a correction item select switch is operated.

The correction item select switch 406 is designed for selecting an image correction item from the luminance, color signal R, color signal B and contrast in the "manual" mode, and the correction items can be switched in a cyclic fashion each time the correction item select switch 406 is pressed, as shown in FIG. 21. If the correction item select switch 406 is pressed, the "auto 1" and "auto 2" modes are automatically switched to the "manual" mode.

Figure 22:
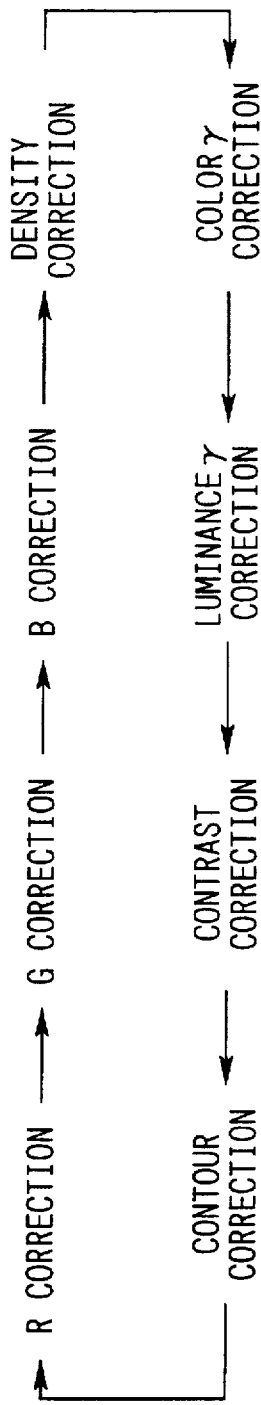
FIG. 22 is a view showing another example of the manner of switching image correction items when a correction item select switch is operated.

The image correction items are not limited to those of the present embodiment as listed above, but may include R, G, B color correction, photographic density correction, γ correction including color γ correction or luminance γ correction or the like, contrast correction, contour correction and others. This case is shown in FIG. 22.

The correction value input switch 407 is designed for entering a correction amount of the image correction item selected by the correction item select switch 406, and has a "+" switch and a "−" switch. The correction amount of the image correction item selected increases or decreases each time the "+" switch or "−" switch is pressed, respectively.

The film feed unit 402 includes a film feed switch 409 for effecting film feeding operations, such as taking up and rewinding of the film 102.

Referring to flow charts shown in FIG. 5 through FIG. 15, the operation of the film image reproduction signal output apparatus will be explained.

The operation starting from step S501 is initiated once the power source switch 403 is turned on, and step S502 is then executed to confirm by a camera switch that is not illustrated whether the camera unit 401 is attached to the film feed unit 402. If the camera switch is in the ON state and the units 401, 402 are detached from each other, the control flow goes to step S518 to set the position to "camera". If the camera switch is in the OFF state and the camera unit 401 is attached to the film feed unit 402, the control flow proceeds to step S503.

Whether the camera unit 401 is attached to the film feed unit 402 or not may be judged by determining whether the communication between these units is feasible or not.

Initially, there will be explained the case where the camera unit 401 is attached to the film feed unit 402, and an image on the film 102 is displayed.

In step S503, the "camera"/"negative"/"positive" position is tentatively set to "negative" that is supposed to be used at the highest frequency. In the following step S504, it is confirmed by a cartridge detection switch (not shown) whether the cartridge 101 has been loaded into the cartridge chamber 410. If the cartridge 101 is loaded in the cartridge chamber 410, step S505 is then executed to determine by the switch 106 whether the film in the cartridge 101 has been developed. If the film in the loaded cartridge 101 has not been developed, step S519 is executed to eject the cartridge 101 by a mechanism that is not illustrated, and the processing is terminated. In this ejecting operation, a lid of the cartridge chamber 410 is opened, and the cartridge 101 is discharged or ejected from the chamber 410, for example.

Where the film in the loaded cartridge 101 has been developed, step S506 is executed to read a cartridge ID by a reading device that is not illustrated. This cartridge ID is peculiar or unique to each cartridge, and is recorded in the form of a bar code and a symbol(s) on the surface of the cartridge 101. In step S507, it is determined whether data disc information that corresponds to the ID of the cartridge 101 is stored in the memory 124 or not.

In this connection, the cartridge 101 is provided with a data disc that is rotatable in synchronization with a cartridge spool, and a radial bar code pattern is recorded on this disc. In the present specification, bar code information on the data disc is called data disc information. The data disc information includes the type (color/black-and-white and negative/positive) of the film, number of pictures that can be taken, and the ISO sensitivity.

Where images on the film of the loaded film cartridge 101 have been displayed before, and the data disc information of this film is stored in the memory 124, there is no need to read the data disc information again, and step S515 is thus executed to set the current position to the position stored in the memory 124, and proceeds to S516.

Where the data disc information of this film is not stored in the memory 124, step S508 is executed to read the data disc information by means of the reading device not illustrated. In step S509, it is determined whether the film 102 is a positive film based on the data disc information thus read, and, if it is a positive film, the control flow goes to step S513 to set the position to "positive". If the film 102 is not a positive film, step S510 is executed to determine whether the film 102 is a negative film, and, if it is a negative film, the control flow goes to step S512 to set the position to "negative".

If the film 102 cannot be determined to be positive or negative, step S511 is executed to provide a warning, and the control flow proceeds to step S512 to tentatively establish the "negative" position that is supposed to be used at the highest frequency. The detection of the negative or positive film fails where negative/positive information is not originally recorded on the cartridge 101, or where the reading device for reading the data disc information is at fault, for example.

In step S514, the cartridge ID of the loaded cartridge 101 and the data disc information are stored in the memory 124 such that the ID is associated with the data disc information. In the following step S516, it is determined whether magnetically recorded information of this film 102 is stored in the memory 124 or not. If the images on the film 102 of the loaded cartridge 101 have been displayed before, and the magnetically recorded information is stored in the memory 124, there is no need to re-read the magnetically recorded information, and thus step S517 is executed to determine whether image correction information of this film 102 is stored in the memory 124 or not.

The above-indicated magnetically recorded information is recorded in a leading portion and a given magnetically recorded portion of each exposed frame of the film 102. The leading portion contains information, such as a title, that relates to the film 102 as a whole, and the magnetically recorded portion contains information relating to each exposed frame, including the date of photographing, exposure value, print size and "image should not be corrected" information.

Figure 6:
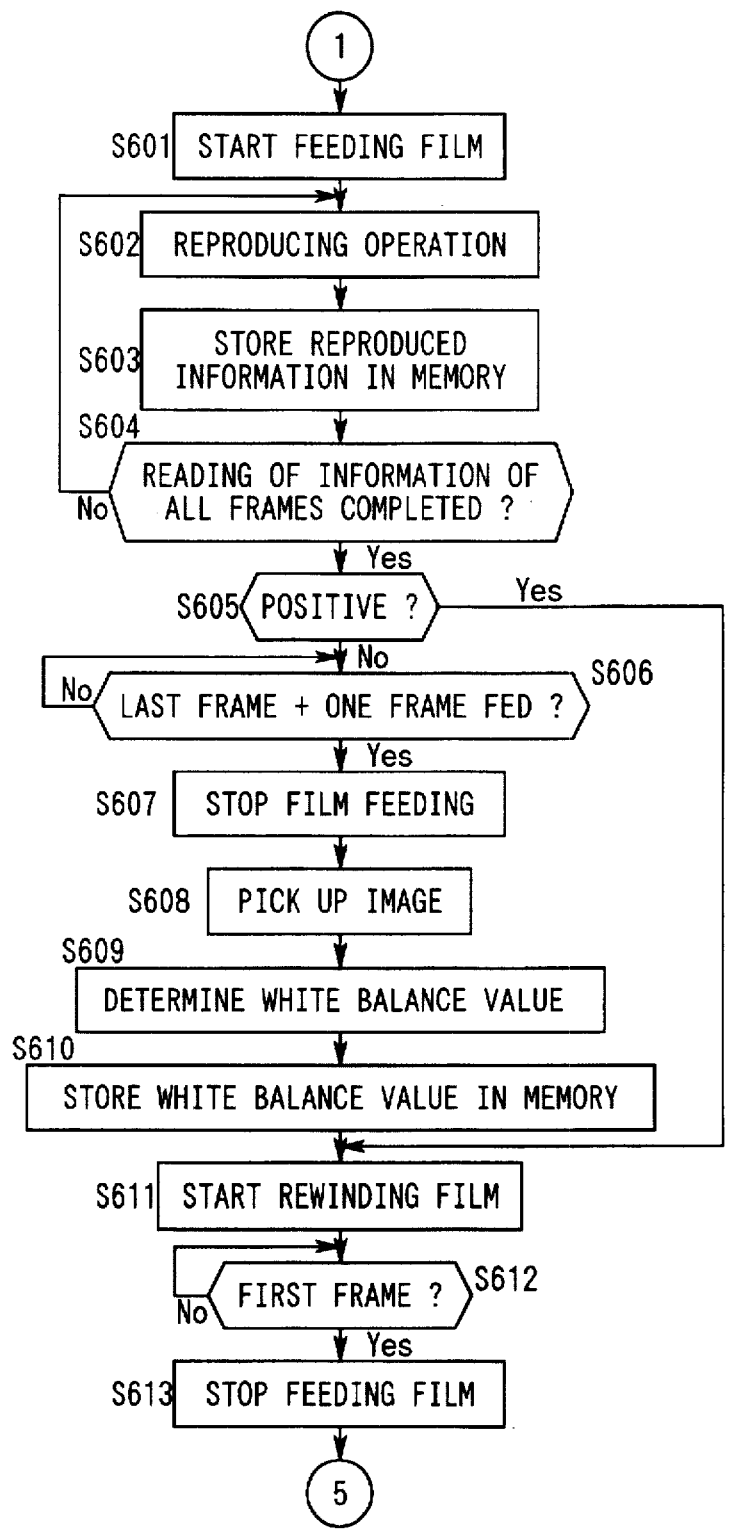
FIG. 6 is a flow chart following that of FIG. 5.

The "image should not be corrected" information is meant to inhibit image correction at a laboratory upon printing, so that a print is made only with a correction value for printing a film in gray when a gray chart is photographed. In the present film image reproduction signal output apparatus, only the required minimum correction is performed with respect to frames on which are recorded "image should not be corrected" information. This image correction will be described later.

Where the magnetically recorded information of the film 102 in the loaded cartridge 101 is not stored in the memory 124, the operation as shown in FIG. 6 is carried out, so that the magnetically recorded information of the film 102 is reproduced, and at the same time a portion of the film 102 in which any image is not recorded or photographed, i.e. film base itself, is picked up so as to determine a white balance value.

In step S601 of FIG. 6, the motor control circuit 118 and motors 104, 105 start feeding the film 102. In the following step S602, the magnetically recorded information of the film 102 is reproduced by the magnetic reading circuit 120 and magnetic head 107. In step S603, the reproduced magnetically recorded information is stored in the memory 124 in association with the cartridge ID and frame number. Step S604 is then executed to determine whether reading of the magnetically recorded information of all frames of the film 102 has been completed or not, and, if it has not been completed, the control flow returns to step S602. If the reading has been completed, the control flow proceeds to step S605.

Next will be described white balance control performed with respect to a positive film and a negative film.

Generally, if automatic white balance control is performed when an image is displayed on a monitor, influences of colors of a film base and illuminating light source are corrected so that the image is displayed with proper colors. If the automatic white balance control is performed when an image of a special scene, such as a scene with a sunset glow, is reproduced, however, the image that looks like a daytime scene is displayed due to an excessive effect of the correction. Hence, the automatic white balance control is not performed while the image of such a scene is reproduced. In this case, however, color correction needs to be manually effected to display an appropriate image since the influences of colors of the film base and illuminating light source are not corrected automatically. Such a manual operation for color correction is cumbersome, and is also difficult to achieve complete correction.

To solve the above problem, the film image reproduction signal output apparatus of the present embodiment performs white balance control using a fixed value, in which only the influences of colors of the film base and illuminating light source are automatically corrected.

As explained in FIG. 1, the film 102 in the image area 126 is illuminated by the illuminating light source 111 through the diffusion plate 112, and the light transmitted through the film 102 is received by the CCD 114.

Since the color of a base of a negative film varies depending upon the type of the film, such as the ISO sensitivity and the manufacturer of the film, a variation in the color temperature due to the color of the film base needs to be corrected. To this end, the CCD 114 receives light transmitted through the film base prior to display of images, so as to detect the color temperature of the transmitted light, thereby to detect the variation in the color temperature due to the color of the film base, namely, a white balance value for making the image of the film base white. Where the automatic balance control is not performed, white balance control is performed using a fixed value that is calculated based on the transmitted light of the film base.

Since a positive film has a transparent base, illuminating light transmitted through the diffusion plate 112 is incident on the CCD 114 without being affected by the film base. Accordingly, there is no need to detect a white balance value with respect to the positive film on each occasion prior to display of images of the film. Thus, the color temperature of the illuminating light is preliminarily detected by letting the CCD 114 receive the illuminating light transmitted through the diffusion plate 112, so as to detect a variation in the color temperature due to the illuminating light, namely, a white balance value for making the image of the illuminating light white. Where the automatic white balance control is not performed, white balance control is performed using a fixed value that is calculated based on the illuminating light. The fixed white balance value is normally detected and stored in memory 124 before shipping the apparatus. However it can be also done at a user side. Moreover, when the illuminating light is exchanged, the fixed white balance value is detected again and stored in the memory 124.

Referring back to FIG. 6, step S605 is executed to determine whether the film 102 is a positive film or not based on the data disc information previously read, and, if it is a positive film, the control flow goes to step S611 since the white balance value has been already calculated based on the illuminating light as described above. If the film 102 is a negative film, the control flow goes to step S606 to detect the white balance value based on the light transmitted through the film base. The film 102, when it is a negative film, is taken up further by one frame and stopped in steps S606, S607 after the last frame is taken up, and a portion of the film 102 that is not exposed, namely, the film base, is placed in the image area 126. The image of the film base is then picked up by the CCD 114 in step S608, and the white balance value is determined based on the light transmitted through the film base in the following step S609. In the next step S610, the thus determined white balance value is stored in the memory 124.

Once the white balance value is determined, the film 102 is rewound in steps S611–S613, so that the first frame is set in the image area 126.

Figure 5:
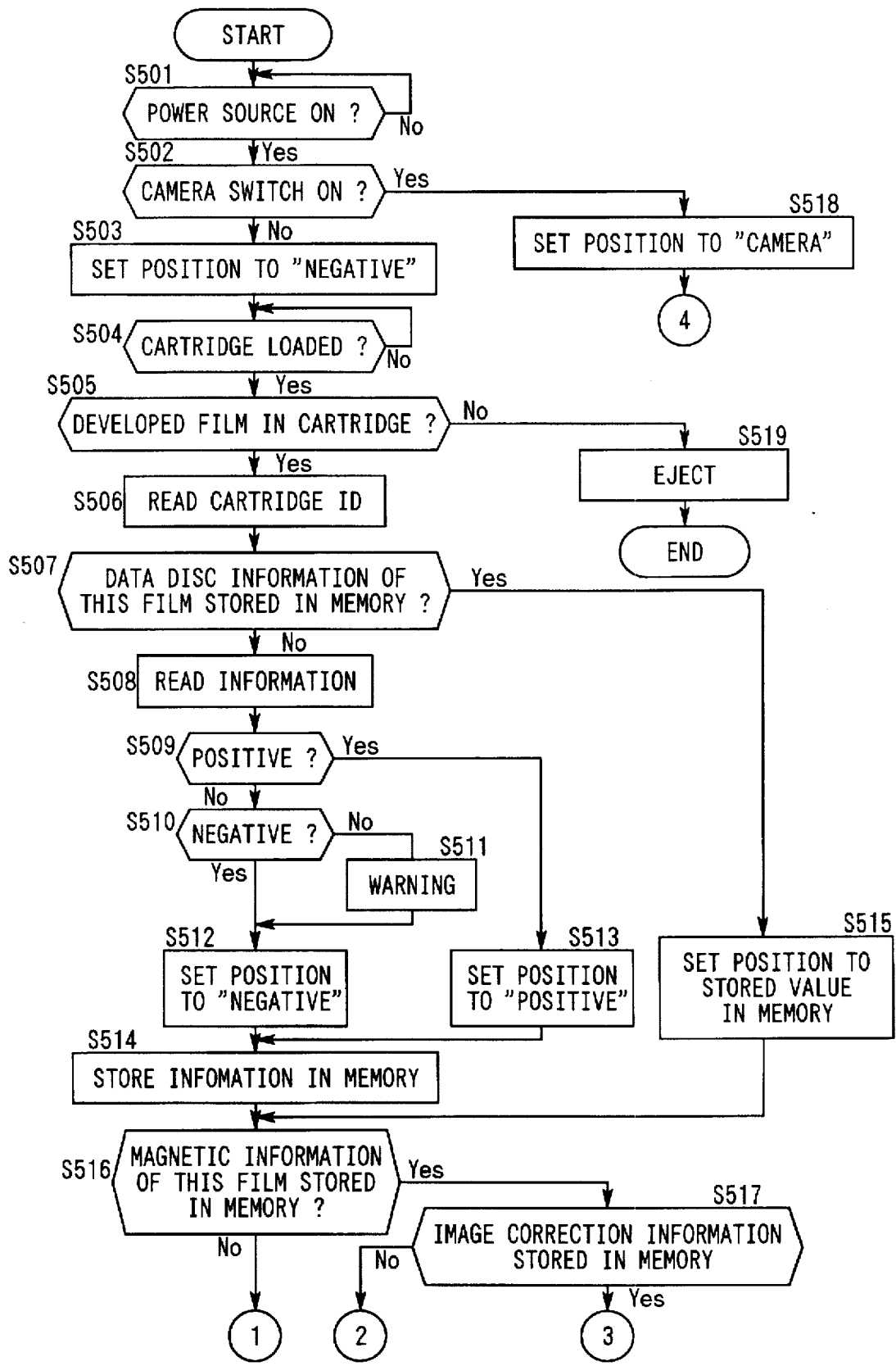
FIG. 5 is a flow chart showing the operation of the film image reproduction signal output apparatus.

A negative decision is obtained in step S517 of FIG. 5 where the magnetically recorded information corresponding to the loaded cartridge 101 is stored in the memory 124, but image correction information including the above-described white balance value is not stored therein. The processing following the negative decision in step S517 will be explained referring to FIG. 7. Since the operation of reproducing the magnetically recorded information is not necessary in this case, this processing includes only determination of the white balance value.

Figure 7:
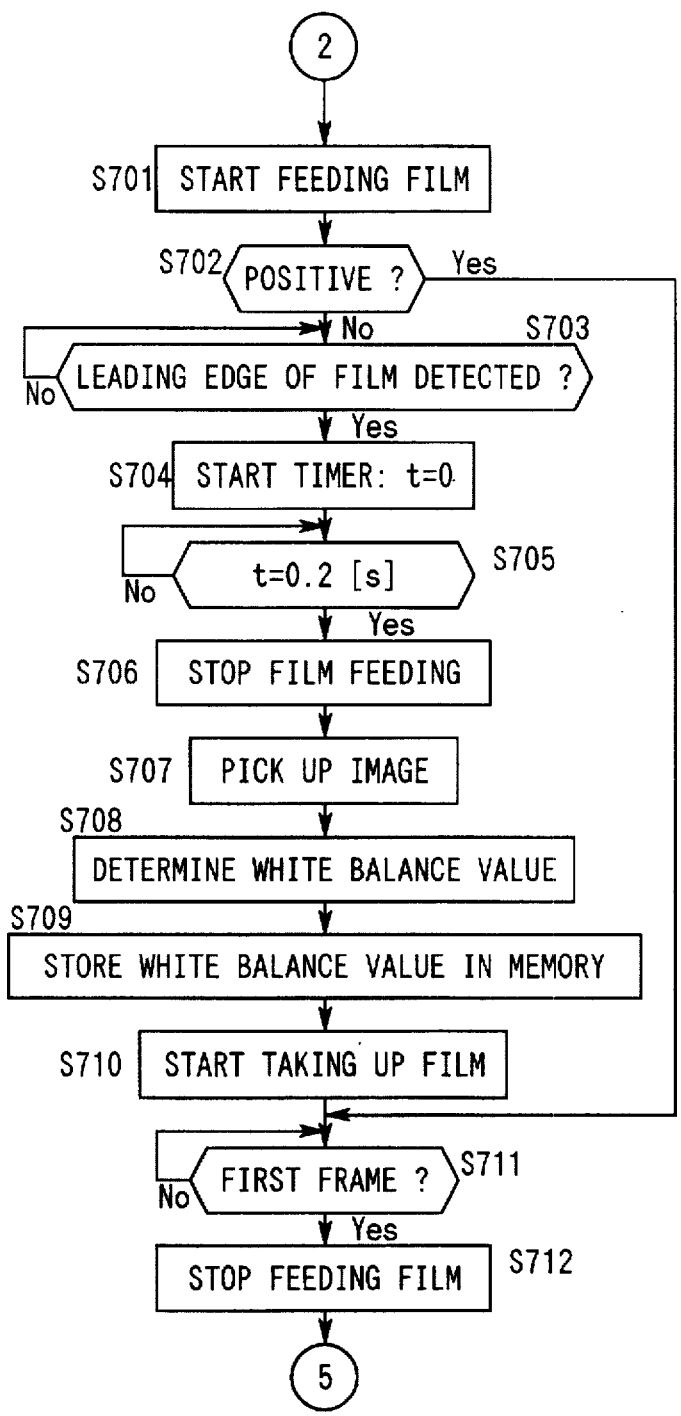
FIG. 7 is a flow chart following that of FIG. 6.
Figure 8:
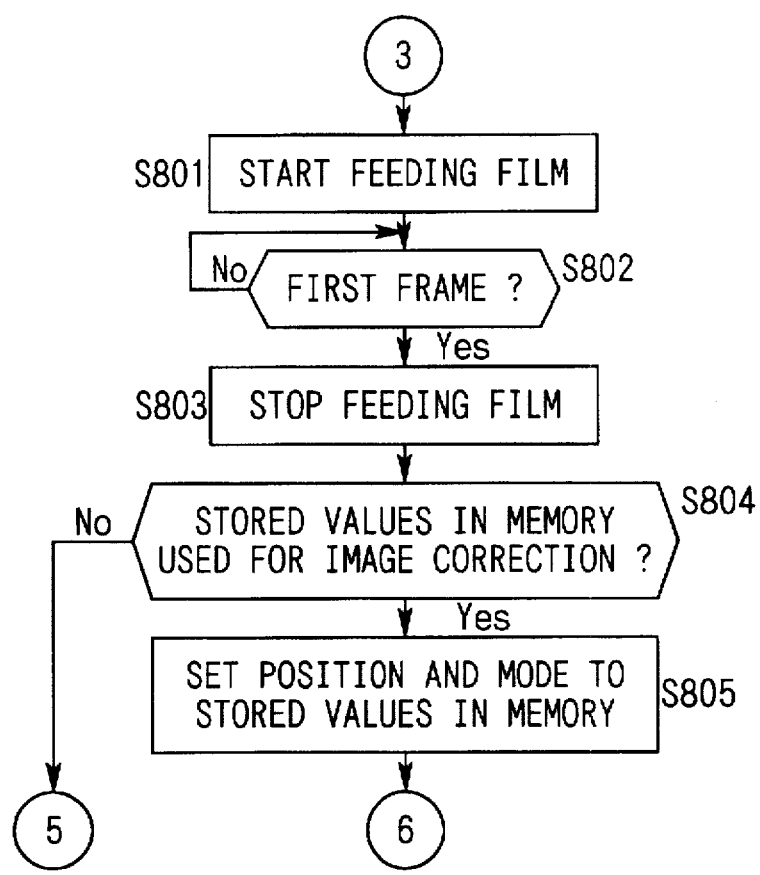
FIG. 8 is a flow chart following that of FIG. 7.

The film 102 begins to be fed in step S701 of FIG. 7, and step S702 then determines whether the film 102 is a positive film based on the data disc information. Where the film 102 is a positive film, the white balance value has already been determined based on the illuminating light, and there is no need to determine this value. Hence, the control flow goes to step S711. Where the film 102 is a negative film, on the other hand, steps S703–S706 are executed to stop feeding the film 102 at a point of time when a predetermined time (0.2 seconds in this embodiment) elapses after the leading edge of the film 102 is detected by the interrupter 109, so that an unexposed portion of the film 102 between the leading edge and the first frame, namely, the film base, is set in the image area 126. In steps S707–S708, the image of the film base is picked up by the CCD 114, and the white balance value is determined based on the light transmitted through the film base, as described above. The thus determined white balance value is then stored in the memory 124 in step S709. Once the white balance value is determined, steps S710–S712 are executed to feed the film 102 so that the first frame is set in the image area 126.

An affirmative decision is obtained in step S517 of FIG. 5 when the magnetically recorded information and image correction information corresponding to the loaded cartridge 101 are stored in the memory 124. The processing following the affirmative decision in step S517 will be explained referring to FIG. 8. Since neither reproduction of the magnetically recorded information nor detection of the white balance value are necessary in this case, steps S801–S803 are executed to feed the film 102 so that the first frame is set in the image area 126, and the following step S804 determines whether the image of the first frame is to be corrected using values stored in the memory 124. This determination is made by a stored value cancel switch included in the set of keys 123. The control flow goes to step S805 where the stored values are used to perform desired corrections, and goes to step S901 of FIG. 9 where the stored values are not used to make perform the corrections. In step S805, the position and mode are set to the stored values in the memory 124, and the control flow proceeds to step S1001 of FIG. 10.

Figure 9:
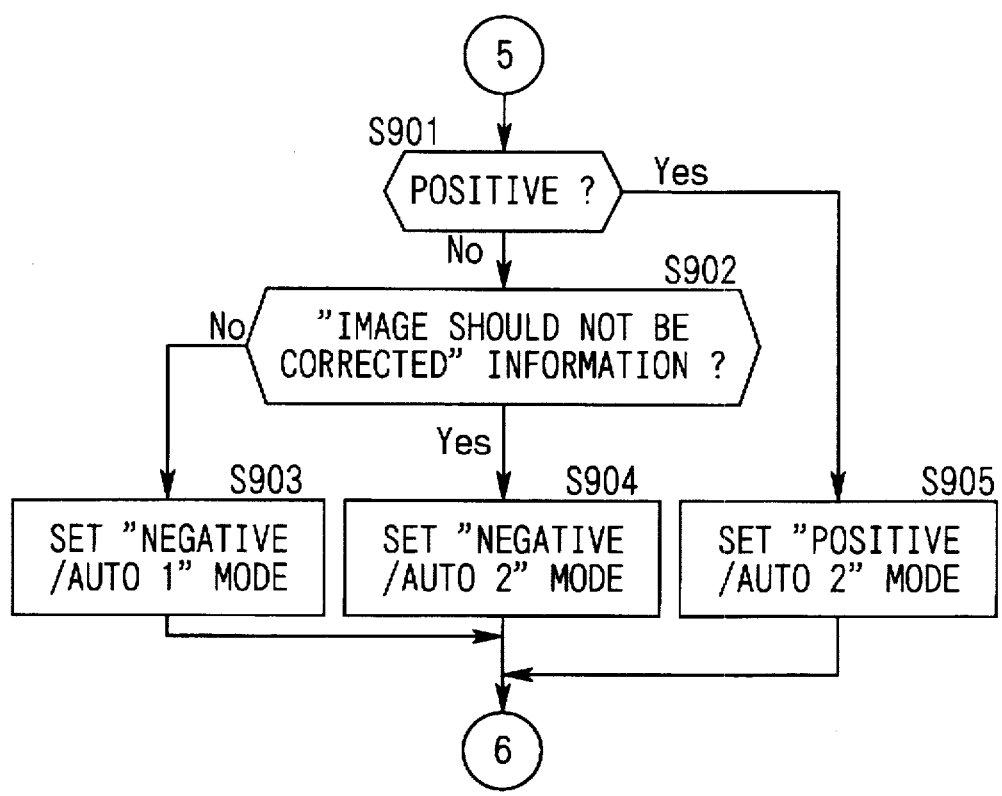
FIG. 9 is a flow chart following that of FIG. 8.

A negative decision is obtained in step S804 where the stored values in the memory 124 are not used to perform corrections for display of the image of the relevant frame. In this case, step S901 of FIG. 9 is executed to determined whether the film 102 is a positive film or a negative film based on the data disc information. As shown in FIG. 16, if the film 102 is a positive film, step S905 is executed to establish the "positive/auto 2" state, and, if the film 102 is a negative film having the "image should not be corrected" information, step S902 is followed by step S904 in which the "negative/auto 2" state is established. If the film 102 is a negative film having no "image should not be corrected" information, step S902 is followed by step S903 in which the "negative/auto 1" state is established. Once the position and mode are set, the control flow proceeds to step S1001 of FIG. 10.

A photographer who uses a positive film selects a filter and other photographing conditions to takes pictures, and thus wants images to be displayed just as they appear on the film. If automatic white balance control is performed for display of the images, the effect of the filter used during photographing is eliminated. Accordingly, the "auto 2" mode is set for the positive film, so as to inhibit the automatic white balance control and perform white balance control using a fixed value to remove only the influence of the illuminating light.

The "auto 2" mode is also set when the film 102 is a negative film having the "image should not be corrected" information. Since the "image should not be corrected" information is set to inhibit image corrections during printing, this information also inhibits the automatic white balance control to be performed when the image on the relevant frame is displayed on the monitor 127, and thus the white balance control using a fixed value is performed only to remove the influence of the color of the film base.

When the film 102 is a negative film having no "image should not be corrected" information, the "auto 1" mode is set for the following reason. Generally, the automatic white balance is often performed with respect to images photographed on a negative film so that the images can be viewed with proper colors. Where the "image should not be corrected" information is not provided, therefore, the automatic white balance control is performed by selecting the "auto 1" mode.

Figure 10:
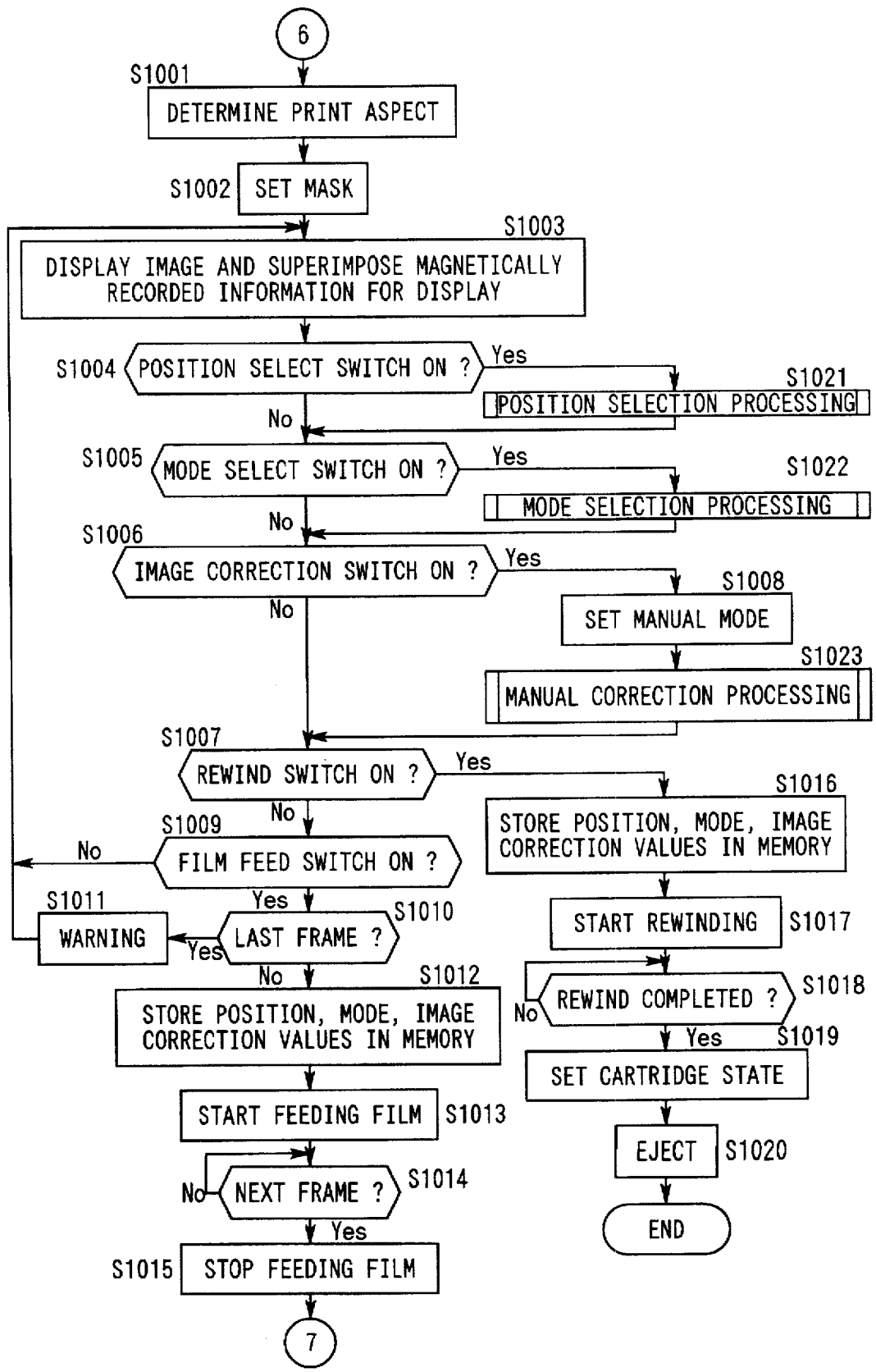
FIG. 10 is a flow chart following that of FIG. 9.

Once the position, mode, and image corrections values such as color correction are set with respect to the first frame in the above-described manner, an image display operation as shown in FIG. 10 is effected.

In step S1001 of FIG. 10, the print aspect ratio is determined from the magnetically recorded information of the film set in the image area 126. Step S1002 is then executed to set a mask that corresponds to the aspect ratio determined in step S1001. In step S1003, the CCD 114 picks up the image on the frame placed in the image area 126, and the image is corrected by the image pickup circuit 115 according to correction amounts of respective image correction items. Further, date and time of photographing and other information, if any, are superimposed on the image by the picture control circuit 116, and the resulting image is displayed on the monitor 127 connected to the video output 125.

Figure 13:
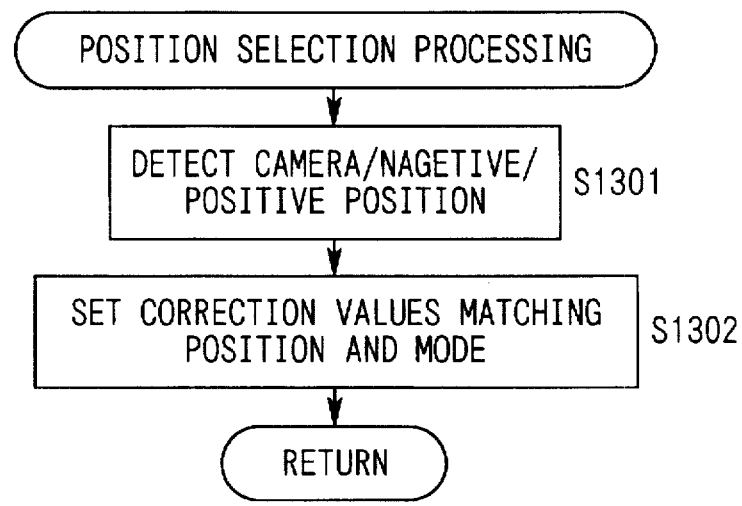
FIG. 13 is a flow chart following that of FIG. 12.

If the position select switch 404 is operated in step S1004, the control flow goes to step 1021 and the position selection processing as shown in FIG. 13 is carried out.

In step S1301 of FIG. 13, the selected position is detected. If the position is changed, the mode that corresponds to the new position is set according to FIG. 19 or FIG. 20. Step S1302 is then executed to set image correction values that match the selected position and mode.

Figure 14:
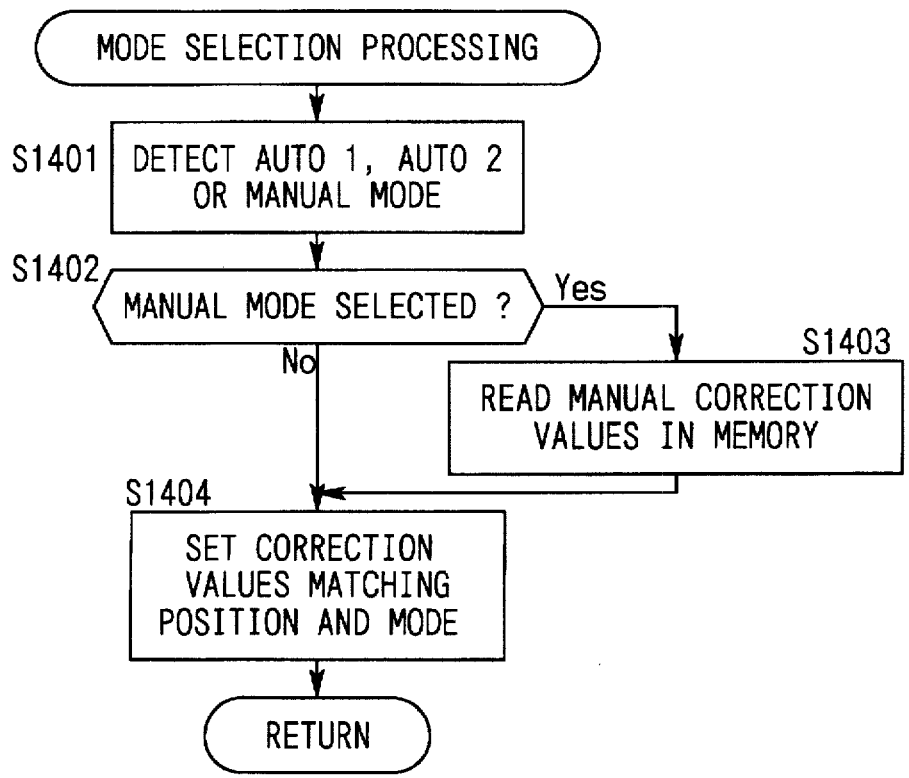
FIG. 14 is a flow chart following that of FIG. 13.

If the mode select switch 405 is operated in step S1005, the control flow goes to step 1022 and the mode selection processing as shown in FIG. 14 is executed.

In step S1401 of FIG. 14, the selected mode is detected. Step S1402 then determines whether the manual mode is selected, and, if the manual mode is selected, step S1403 is executed to read manually entered image correction values stored in the memory 124. These image correction values are manually entered in the manual mode through the correction item select switch 406 and correction value input switch 407. In step S1404, image correction values that match the selected position and mode are set. These image correction values include those stored in the memory 124 in the manual mode.

If the correction item select switch 406 is operated in step S1006, the control flow goes to step S1008 to force the position to be set in the manual mode, and goes to step 1023 to execute the manual correction processing as shown in FIG. 15.

In step S1501 of FIG. 15, the correction item selected by the correction item select switch 406 is detected. Step S1502 is then executed to calculate a correction amount commensurate with the operation of the correction value input switch 407. In step S1503, the correction item detected and obtained correction amount are stored in the memory 124.

Thus, the image correction item and correction amount, which are set in the manual mode in steps S1501 and S1502 of FIG. 15, are stored in the memory 124 in step S1503. If the manual mode is selected in step S1402 of FIG. 14, therefore, the image correction item and correcting amount set in the manual mode are read from the memory 124 in step S1403, and an image correction value including these image correction item and correction amount is set in step S1404. Even if images are displayed in the automatic (auto 1 or auto 2) mode after the image correction value is set in the manual mode with respect to a particular frame, the image of this particular frame is displayed with the set image correction value if the manual mode is resumed, thus eliminating a need to repeat the image correcting operation again.

Referring back to FIG. 10, the explanation on the image displaying operation will be continued.

If step S1007 determines that the switch 409 is operated to rewind the film 102, the control flow goes to step S1016 in which the position, mode, and image corrections values such as color correction with respect to the frame set in the image area 126 are stored in the memory 124 in association with the cartridge ID and the frame number. After the film 102 is completely rewound into the cartridge 101 in steps S1017 and S1018, the data disc of the cartridge 101 is set to "developed", and then the cartridge 101 is ejected in step S1020.

If step S1009 determines that the switch 409 is operated to feed the film 102, the control flow goes to step S1010 to determine whether the frame placed in the image area 126 is the last frame or not. If it is the last frame, step S1011 is executed to provide a warning. If it is not the last frame, the control flow proceeds to step S1012 in which the position, mode, and image correction values such as color correction with respect to the frame placed in the image area 126 are stored in the memory 124 in association with the cartridge ID and the frame number. In steps S1013–S1015, the film 102 is fed to place the next frame in the image area 126.

Since the film is fed to the next frame after the final image correction values of the frame currently placed in the image area 126 are stored in the memory 124 in association with the cartridge ID and the frame number, the image correction values for each frame can be stored without fail.

Figure 11:
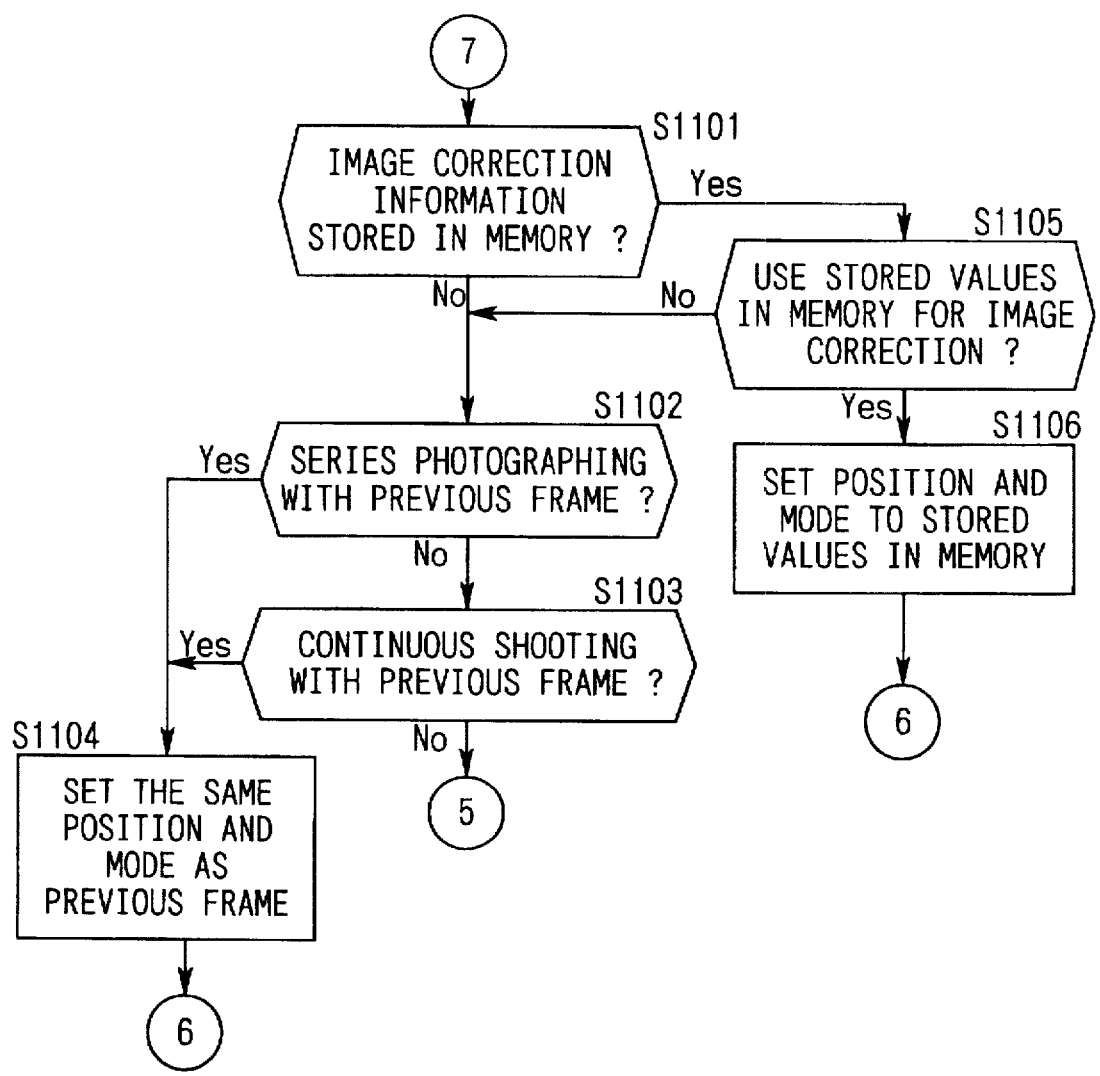
FIG. 11 is a flow chart following that of FIG. 10.

When the next frame is set in the image area 126, the processing as shown in FIG. 11 is performed. Initially, step S1101 determines whether image correction values of this frame are stored in the memory 124, and, if they are stored, the control flow goes to step S1105 to determined whether the stored values in the memory 124 are used for image correction of this frame. Where the stored values in the memory 124 are used, step S1106 is executed to set the position, mode, and image corrections values such as color correction to those stored in the memory 124 in step S1106, and the control flow returns to step S1001 of FIG. 10 to effect the image display operation as described above. Where image correction information of the frame newly placed in the image area 126 is not stored, or where the stored values are not used for image correction, step S1102 is executed to determine, based on the magnetically recorded information of this frame, whether the image on this frame is photographed in a series photographing mode, which is designated when a plurality of pictures are taken with respect to related subjects. In step S1103, it is determined based on the magnetically recorded information of this frame whether the image on this frame is photographed in a continuous shooting mode. If the image on the frame placed in the image area 126 is photographed in the series or continuous shooting mode with the image on the previous frame, step S1104 is executed to set the same position, mode, and image correction values such as color correction as those of the previous frame, and the control flow returns to step S1001 of FIG. 10 to perform the image display operation. If the image correction values of the current frame are not stored, and the image on this frame is not photographed in the series or continuous shooting mode in association with that on the previous frame, the control flow returns to step S901 of FIG. 9 to reset the position and mode.

Thus, since the image of the frame that is photographed in the series or continuous shooting mode is corrected with the same image correction values as those of the previous frame, the image correcting operation need not be effected with respect to each of the plural frames that are photographed in the series or continuous shooting mode, allowing the images of these frames to be viewed with the same color tone.

Figure 12:
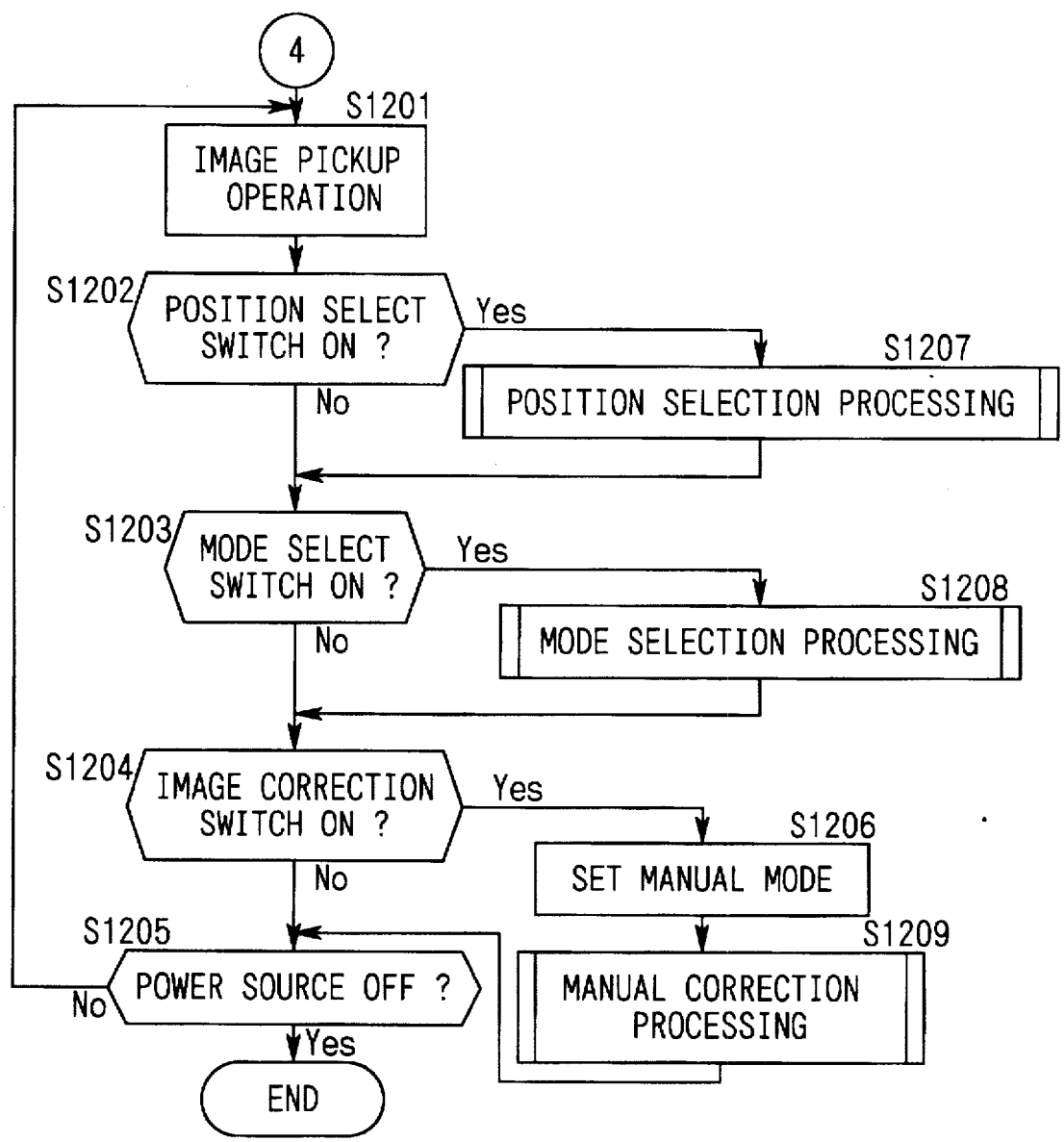
FIG. 12 is a flow chart following that of FIG. 11.

When the camera unit 401 is used alone, the processing as shown in FIG. 12 is performed. In step S1201, the camera unit 401 operates like a general video camera to pick up images of various subjects. If the position select switch 404 is operated in step S1202, the control flow goes to step S1207 and the above-described position selection processing as shown in FIG. 13 is performed. If the mode select switch 405 is operated in step S1203, the control flow goes to step S1208 and the above-described mode selection processing as shown in FIG. 14 is performed. If the correction item select switch 406 and correction value input switch 407 are operated in step S1204, the control flow goes to step S1206 to set the manual mode, then goes to step S1209 and the above-described manual correction processing as shown in FIG. 15 is performed. In step S1205, the whole processing is terminated if the power source switch 403 is operated to turn off the power source.

While the image correction information is stored in the non-volatile memory 124 in the illustrated embodiment, the same information may be stored in a memory of a battery back-up type, or in a memory card or a floppy disc.

While the film image reproduction signal output apparatus is connected to the monitor 127 as an external device in the illustrated embodiment, the output apparatus of the present invention may incorporate the monitor so as to provide a unit-type apparatus.

What is claimed is:

1. A film image reproduction signal output apparatus comprising:

an image pickup device that picks up an image on a film that has been developed;

an image reproduction circuit that produces an image reproduction signal based on an image signal received from said image pickup device;

a film type detector that determines whether said film is a negative film or a positive film; and a control circuit that controls said image reproduction circuit so as to produce said image reproduction signal by reversing said image signal from said image pickup device when said film type detector determines that said film is a negative film.

2. A film image reproduction signal output apparatus according to claim 1, wherein said film type detector determines whether said film is a negative film or a positive film based on information recorded on one of said film and a film cartridge containing the film.

3. A film image reproduction signal output apparatus according to claim 1, wherein said control circuit recognizes that said film is a negative film when the film type detector is incapable of determining whether the film is a negative film or a positive film.

4. A film image reproduction signal output apparatus according to claim 1, further comprising:

a film feeding device that drives said film so that said image pickup device can pick up an unexposed portion of said film; and a white balance circuit that performs a white balance control for said image signal of the film frame to be picked up based on said image signal of said unexposed portion of said film when said film type detector determines that said film is a negative film.

5. A film image reproduction signal output apparatus according to claim 1, further comprising:

a white balance circuit that performs a white balance control for an image signal with a first white balance mode or a second white balance mode, in said first white balance mode, said white balance control being done based on the picked up image signal, and in said second white balance mode, said white balance control being done based on a fixed value previously set, and a white balance selection device that selects any one of said first and second white balance modes, wherein said white balance circuit, (1) performs a white balance control with the selected white balance mode, when said film type detector determines that said film is a negative film, and (2) performs a white balance control with said second white balance mode even if said first white balance mode is selected by said white balance selection device, when said film type detector determines that said film is a positive film.

6. A film image reproduction signal output apparatus, comprising:

an apparatus body that holds a film that has been developed;

a camera unit that picks up an image on said film, said camera unit being detachable from said apparatus body;

an image reproduction circuit that produces an image reproduction signal based on an image signal received from said camera unit;

a camera unit state detector that determines whether said camera unit is attached to or detached from said apparatus body;

a film type detector that determines whether said film is a negative film or a positive film; and a control circuit that controls said image reproduction circuit so as to produce said image reproduction signal by reversing said image signal from said camera unit if said camera unit state detector determines that said camera unit is attached to said apparatus body, and said film type detector determines that said film is a negative film.

7. A film image reproduction signal output apparatus according to claim 6, wherein said film type detector determines whether said film is a negative film or a positive film based on information recorded on one of said film and a film cartridge containing the film.

8. A film image reproduction signal output apparatus according to claim 6, wherein said film type detector recognizes that said film is a negative film when the film type detector is incapable of determining whether the film is a negative film or a positive film.

9. A film image reproduction signal output apparatus according to claim 6, further comprising:

a film feeding device that drives said film so that said image pickup device can pick up an unexposed portion of said film; and a white balance circuit that performs a white balance control for said image signal of the film frame to be picked up based on said image signal of said unexposed portion of said film when said film type detector determines that said film is a negative film.

10. A film image reproduction signal output apparatus according to claim 6, further comprising:

a white balance circuit that performs a white balance control for an image signal with a first white balance mode or a second white balance mode, in said first white balance mode, said white balance control being done based on the picked up image signal, and in said second white balance mode, said white balance control being done based on a fixed value previously set, and a white balance selection device that selects any one of said first and second white balance modes, wherein said white balance circuit,
  (1) performs a white balance control with the selected white balance mode, when said film type detector determines that said film is a negative film, and
  (2) performs a white balance control with said second white balance mode even if said first white balance mode is selected by said white balance selection device, when said film type detector determines that said film is a positive film.

11. A film image reproduction signal output apparatus according to claim 10, wherein, when said camera unit state detector determines that said camera unit is detached from said apparatus body, said white balance circuit performs a white balance control with said first white balance mode even if said second white balance mode is selected by said white balance selection device.

* * * * *